United States Patent [19]

Ju et al.

[11] Patent Number: 5,285,340
[45] Date of Patent: Feb. 8, 1994

[54] THIN FILM MAGNETIC HEAD WITH CONFORMABLE POLE TIPS

[75] Inventors: Kochan Ju; Mohamad T. Krounbi, both of San Jose, Calif.

[73] Assignee: International Business Machines Corporation, Armonk, N.Y.

[21] Appl. No.: 843,676

[22] Filed: Feb. 28, 1992

[51] Int. Cl.⁵ .................. G11B 5/187; G11B 5/23; G11B 5/33
[52] U.S. Cl. .................. 360/119; 360/122; 360/126
[58] Field of Search .............. 360/119, 120, 122, 126

[56] References Cited

U.S. PATENT DOCUMENTS

| | | | |
|---|---|---|---|
| 4,589,042 | 5/1986 | Anderson et al. | 360/125 |
| 4,590,530 | 5/1986 | Sakakima et al. | 360/126 |
| 4,839,197 | 6/1989 | Henderson | 427/116 |

FOREIGN PATENT DOCUMENTS

| | | | |
|---|---|---|---|
| 3-134808 | 6/1991 | Japan | 360/119 |

OTHER PUBLICATIONS

Technical Disclosure Bulletin, vol. 15, No. 7, Dec. 1972, p. 2182.

*Primary Examiner*—Robert S. Tupper
*Attorney, Agent, or Firm*—Leslie G. Murray

[57] ABSTRACT

A thin film magnetic head comprises a first magnetic yoke layer extending from a back gap region to a sensing edge such as an air bearing surface (ABS), and a second magnetic yoke layer contacting the first magnetic yoke layer at the back gap region and extending to the ABS in a position aligned with, but spaced from, the first magnetic yoke layer. A pole tip structure, with geometry formed by a single photolithographic process, comprising a first pole tip layer, a gap forming layer, and a second pole tip layer is positioned between the first and second magnetic yoke layers at the ABS with the first pole tip layer in contact with the first magnetic yoke layer and the second pole tip layer in contact with the second magnetic yoke layer at the ABS.

6 Claims, 7 Drawing Sheets

THIN FILM MAGNETIC HEAD WITH CONFORMABLE POLE TIPS

BACKGROUND OF THE INVENTION

1. Field of the Invention

This invention relates in general to a thin film magnetic head and, more particularly, to an improved pole tip structure for a thin film magnetic head.

2. Description of the Prior Art

The prior art discloses a magnetic transducer referred to as a thin film magnetic head, and this transducer has met the requirements for magnetic recording technology for many years. In magnetic recording technology it is continually desired to improve the areal density at which information can be recorded and reliably read. For this reason, the design of thin film magnetic heads has changed to meet the changing density requirements.

For example, a prior art design is shown in FIG. 2 in which the width of the first pole piece P1 deposited on the substrate was greater than that of the second pole piece P2 to prevent a problem associated with misregistration between the pole pieces. Tighter side reading and side writing specifications lead to the trimmed pole tips shown in FIG. 3. In this case, the width of the pole tips was not limited to the precision with which the pole tips could be deposited, since the pole tips were trimmed by ion milling, for example, to a specified width with both pole tips P1 and P2 substantially the same width. However, since conventional ion milling processes generally require a thick photoresist process, the method is limited for narrow track width applications where a very high aspect ratio of resist height to width is required.

There has been some attempt to improve the performance of thin film magnetic heads by the use of a composite magnetic structure. For example, the publication IBM Technical Disclosure Bulletin, Vol. 15, No. 7, December, 1972, p. 2182, describes a magnetic head in which the magnetic circuit is formed of upper and lower ferrite blocks 2 and 8, a permalloy back gap closure 5, and permalloy pole pieces 4 and 10 which contact the ferrite blocks and extend to the air bearing surface.

U.S. Pat. No. 4,589,042 discloses a thin film inductive head in which both the upper and lower pole pieces are deposited in two steps. In one step the yoke is produced, and in the subsequent step the pole tip is produced so that the yokes and pole tips can be produced of different magnetic materials.

U.S. Pat. 4,839,197 discloses a thin film inductive head in which the lower magnetic pole is produced in whole and the upper magnetic pole is produced in parts. The first part is the pole tip region after which the coil is produced, and the remainder of the upper magnetic pole is then produced in contact with the pole tip region and with the back gap region.

None of the references disclose a thin film magnetic head in which the pole tips and gap layer are produced separately and are in contact with the magnetic yoke layers at the air bearing surface so that precisely formed thick pole tips can be produced.

SUMMARY OF THE INVENTION

It is therefore the principal object of this invention to provide a thin film magnetic head in which the pole tips are formed in a separate step from the remainder of the magnetic circuit so that the pole tips are precisely aligned and the pole tip width and thickness are closely controlled.

In accordance with the present invention, a thin film magnetic head comprises a first magnetic yoke layer which extends from a back gap region to a sensing edge, and a second magnetic yoke layer which contacts the first magnetic yoke layer at the back gap region and extends to the sensing edge in a position aligned with, but spaced from, the first magnetic yoke layer. A pole tip structure comprising a first pole tip layer, a gap forming layer, and a second pole tip layer is positioned between the first and second magnetic yoke layers at the sensing edge with the first pole tip layer in contact with the first magnetic yoke layer and the second pole tip layer in contact with the second magnetic yoke layer at the sensing edge.

This structure has the advantage of greater precision in both the pole tip dimensions and the tolerances to which the pole tip dimensions can be held. In addition, other important dimensions can be more precisely defined. As a result, the thin film magnetic head has greatly improved side reading and side writing characteristics in narrow track applications.

For a fuller understanding of the nature and advantages of the present invention, reference should be made to the following detailed description taken in conjunction with the accompanying drawings.

DESCRIPTION OF THE PREFERRED EMBODIMENTS

Figure 1:
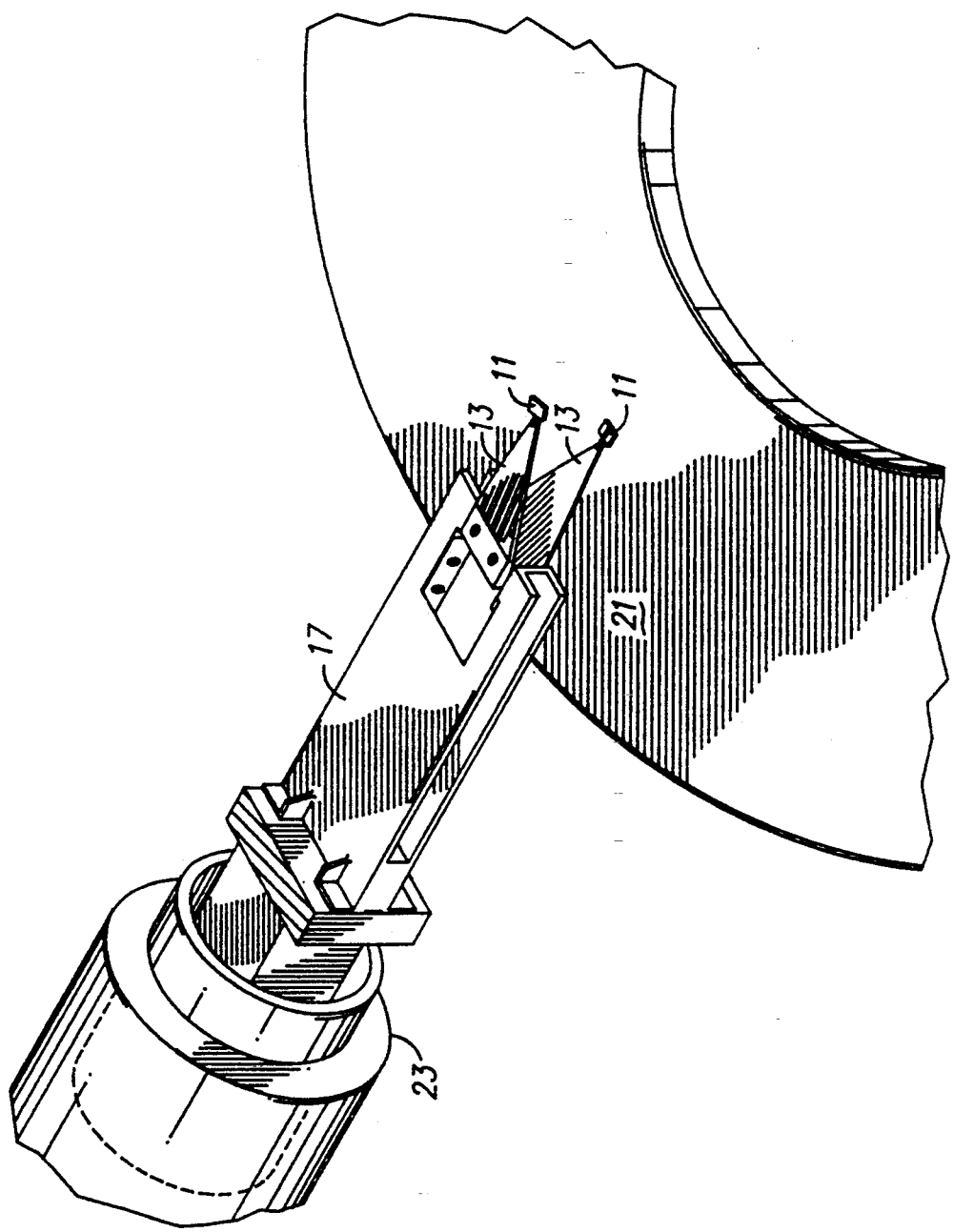
FIG. 1 is a schematic perspective view of a magnetic disk storage system.
Figure 2:
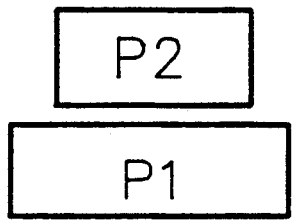
FIG. 2 is an air bearing surface view of the pole tips of a first embodiment of a prior art thin film magnetic head.

With reference to FIG. 1, a magnetic disk storage system comprises a magnetic head arm 17, and at least one magnetic head suspension assembly 13 is attached to the head arm 17. In the embodiment shown, one magnetic head suspension assembly 13 is attached to the top of the head arm and another magnetic head suspension assembly 13 is attached to the bottom of the head arm assembly 17. Each suspension assembly supports at its end a magnetic head slider 11, and each magnetic head slider 11 has one or more magnetic transducer means, generally called magnetic heads, disposed so that the transducing gap may be in transducing relation with magnetic disk 21 surfaces, only one of which is shown in the drawing. Electrical signals are conducted from the magnetic heads to the host system for use in the host system. Head arm 17 is attached to a conventional actuator 23, such as a voice coil motor, for example, for accessing the magnetic heads to various tracks on the magnetic disk 21.

According to the present invention, a thin film magnetic head is provided in which the pole tips are formed in a separate step from the remainder of the magnetic circuit so that the pole tips are precisely aligned and the pole tip width and thickness are closely controlled. As a result, the thin film magnetic head has greatly improved side reading and side writing characteristics in narrow track applications.

Figure 4:
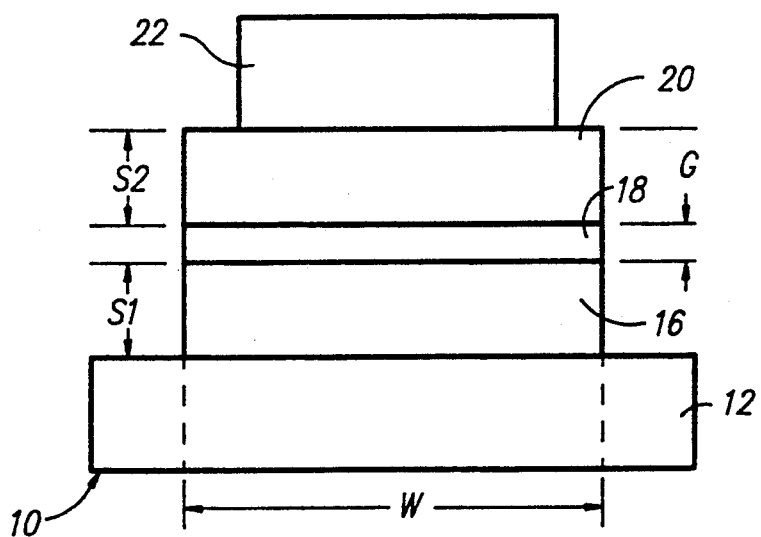
FIG. 4 is an air bearing surface view of the pole tips of a thin film magnetic head according to the present invention.
Figure 5:
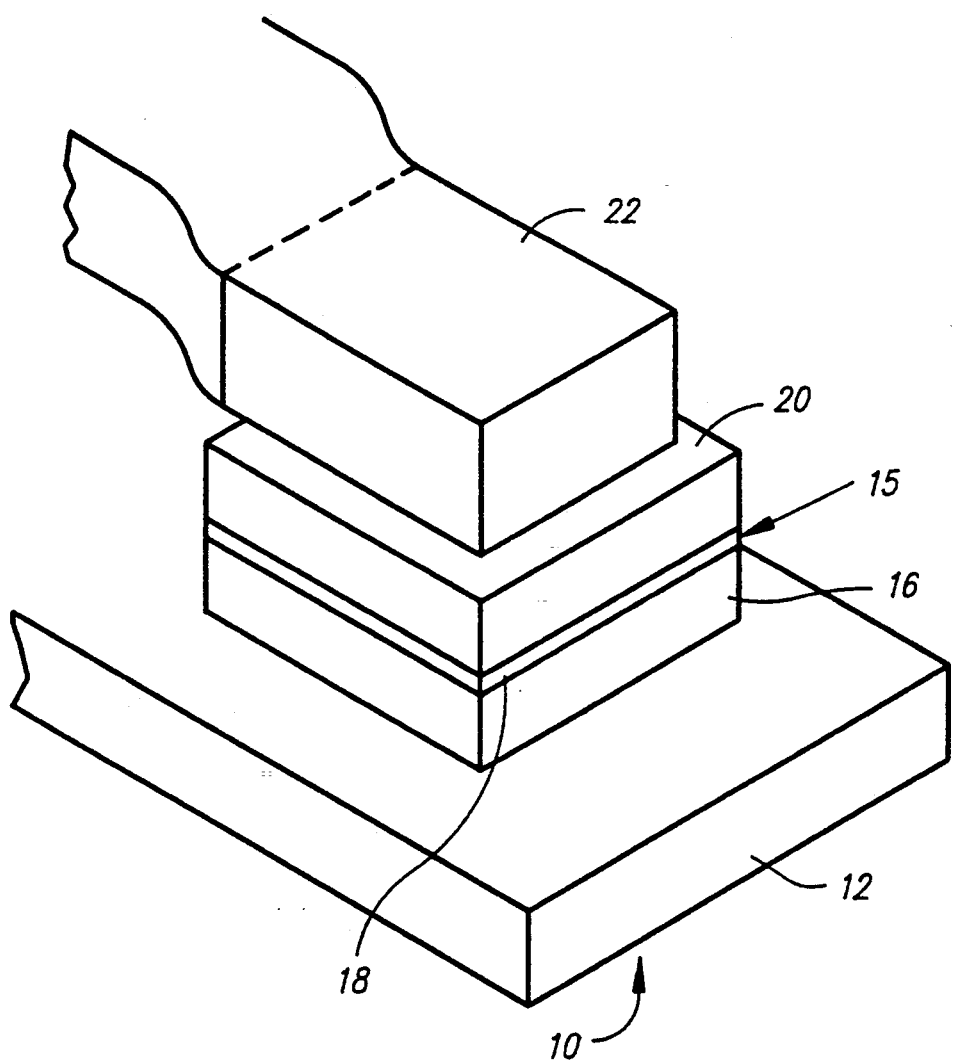
FIG. 5 is a perspective view of the pole tips of a thin film magnetic head according to the present invention.

FIGS. 4 and 5 show a preferred embodiment of the pole tips according to the present invention. FIG. 4 shows a sensing edge view of the pole tips, and FIG. 5 shows a perspective view of the pole tips prior to lapping the head to the desired throat height. In the specific embodiment, the sensing edge is an air bearing surface (ABS), however, it will be apparent that the present invention is also applicable to a head for a contact recording system. The thin film magnetic head 10 comprises a first magnetic yoke layer 12 that is deposited on a nonmagnetic substrate 14 (see FIG. 7). A pole tip assembly 15, which includes a first pole tip layer 16, a gap forming layer 18, and a second pole tip layer 20, is formed in contact with the first magnetic yoke layer 12. Gap forming layer 18 is formed of a suitable metal such as NiP, Au, or Cu, for example. First pole tip layer 16, gap forming layer 18 and second pole tip layer 20 are formed in the same series of steps while using the same mask as will be described in greater detail later. The magnetic circuit for the thin film magnetic head 10 is then completed by a second magnetic yoke layer 22 in contact with the pole tip assembly 15.

Theoretical calculations have shown that the majority of the side reading and side writing is produced at the pole tip regions within a few gap lengths G away from the transducing gap 19. The effective track width W is defined by the area of overlap of the pole tip layers 16, 20 at the transducing gap. To limit the amount of side reading and side writing to an acceptable level, the distance S1 from the top surface of the first magnetic yoke layer 12 to the gap forming layer 18 should be greater than 2G, and the distance S2 from the bottom surface of the second magnetic yoke layer 22 to the gap forming layer 18 should also be greater than 2G. This method of forming the pole tips results in pole tips having precise alignment and precisely the same width W at the gap region.

Figure 6:
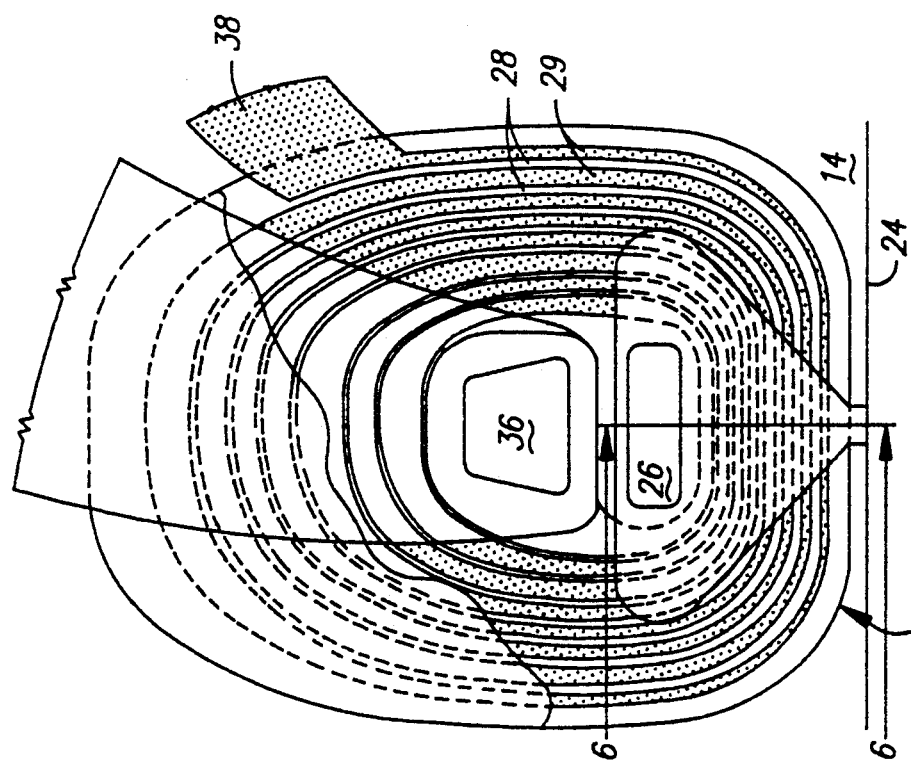
FIG. 6 is is a plan view of a thin film magnetic head according to the present invention.
Figure 7:
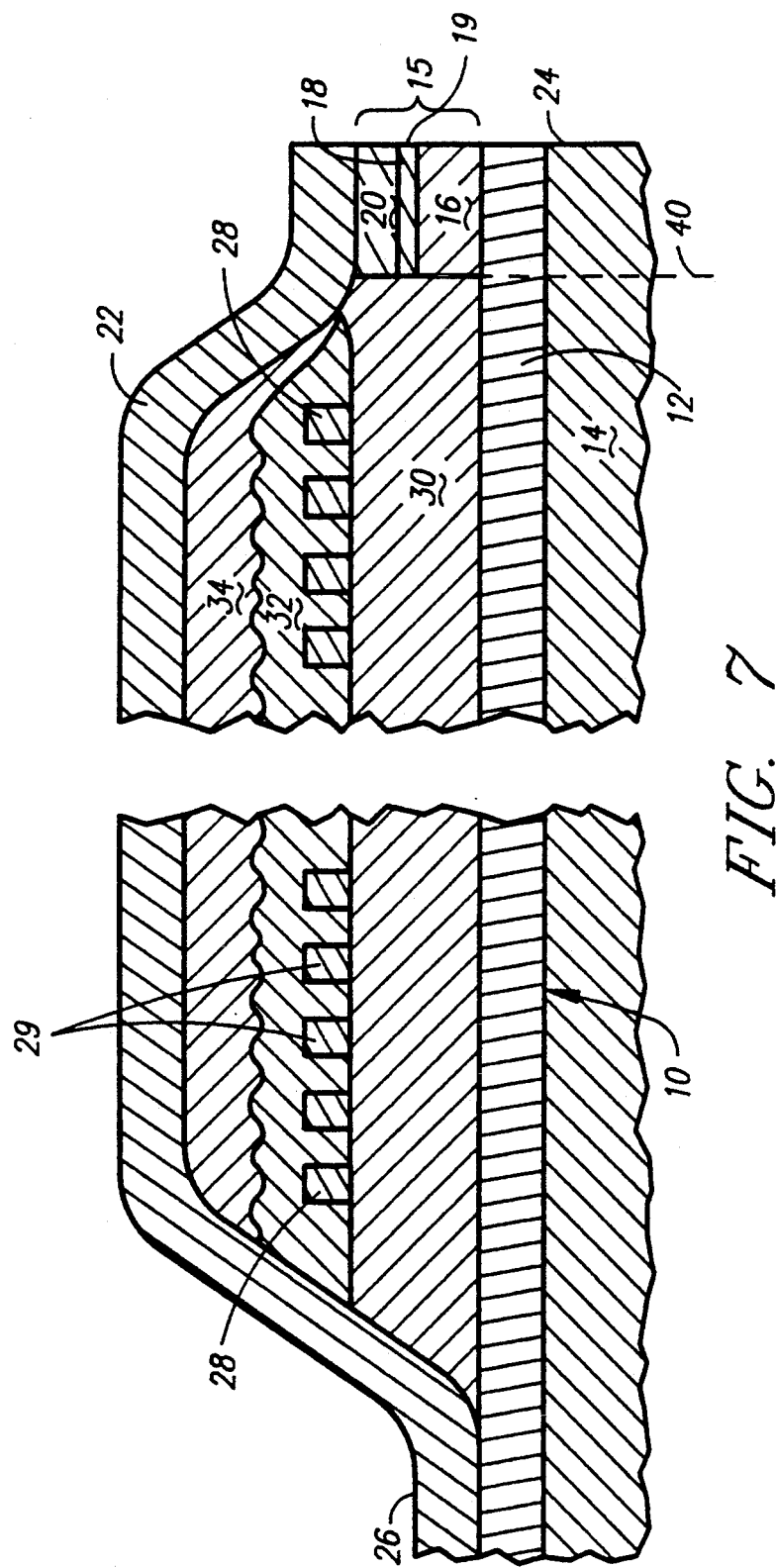
FIG. 7 is a section view taken along the lines 6—6 in FIG. 6.

The completed thin film magnetic head 10 is shown in FIGS. 6 and 7. The gap forming layer 18 (FIG. 7) defines a transducing gap 19 which interacts in transducing relation with a magnetic medium, preferably in an air bearing relation, as is well known in the art. For this purpose, the nonmagnetic substrate 14 is formed as a slider with a sensing edge such as ABS 24 that flies closely adjacent to the recording medium, which may be a rotating magnetic disk, during operation of a disk file.

Both the first magnetic yoke layer 12 and the second magnetic yoke layer 22 extend from ABS 24 to a back gap closure 26. The two magnetic yoke layers 12 and 22 are separated at the ABS 24 by the pole tip assembly 15, and contact each other at the back gap region 26. In the space between the ABS 24 and the back gap closure 26, the two magnetic yoke layers 12, 22 are spaced apart to provide space for a coil structure 28. The coil structure 28 and the two magnetic yoke layers 12, 22 are separated by layers 30, 32, and 34 of nonmagnetic electrically insulating material. Coil structure 28 comprises a plurality of turns 29 in a spiral fashion which has a first electrical contact 36 in the central area and an outer electrical contact 38. The contacts 36, 38 are connected to external wiring and head circuitry (not shown) for processing WRITE and READ data signals.

Figure 8:
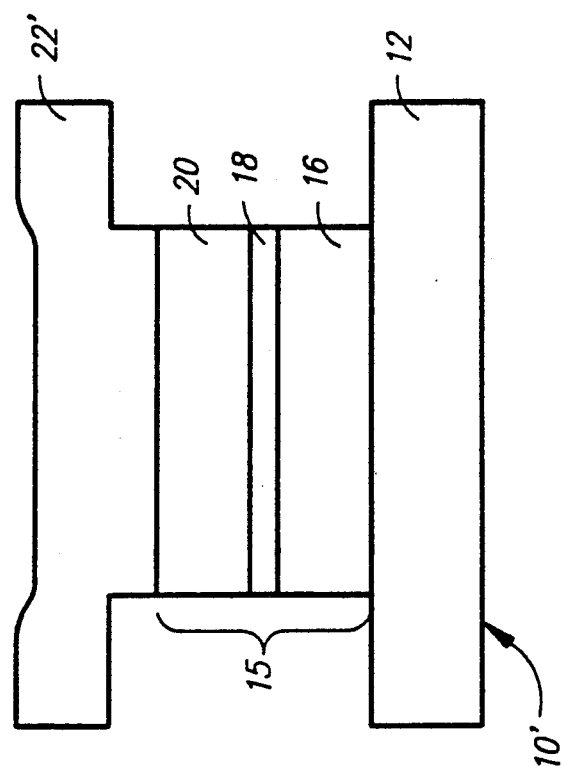
FIG. 8 is an air bearing surface view of the pole tips of an alternate embodiment of a thin film magnetic head according to the present invention.

An alternate embodiment of the thin film magnetic head 10' according to the present invention is shown in FIG. 8. In this embodiment, the first magnetic yoke layer 12 is wider than the first pole tip layer 16, and the second magnetic yoke layer 22' also is wider than the second pole tip layer 20. This embodiment can be used when an insulator material such as $Al_2O_3$ or $SiO_2$ is used to form the masking layer by which the pole tip assembly is defined. This embodiment produces a better WRITE head and is easier to make since the second yoke layer 22 does not have to be narrower then the associated second pole tip layer 20 in the pole tip region and therefore layer 22 can be made with less critical dimensions in the pole tip area.

In accordance with the present invention, the pole tip assembly 15 is produced so that conformable pole tips result. This design has the advantage of greater precision in both the pole tip dimensions and the tolerances to which the pole tip dimensions can be held. Another advantage is in the greater precision with which other important dimensions can be defined. Throat height is one important dimension which must be closely controlled to achieve optimum performance in the thin film magnetic head, and throat height is measured from the ABS 24 to the so-called zero throat position. The zero throat position is the point at which the two magnetic yoke layers 12, 22 begin to diverge in order to enclose the coil structure 28. In prior art thin film magnetic heads, the zero throat position is defined by an insulation layer which is formed at an angle generally within the range of 20 to 60 degrees. In direct contrast, in the present invention, the zero throat position 40 is defined by a 90 degree surface since the insulation layer 30 defines the edge of the pole tip assembly 15. Therefore, the throat height can be determined with much greater precision since it is measured in relation to a well defined edge compared to a sloped edge in the prior art design.

The method for making the thin film magnetic head, according to the present invention will now be described. The conformable thin film magnetic head structure comprises a first magnetic yoke layer 12, a pole tip assembly 15, and a second magnetic yoke layer 22 as shown in FIGS. 4 and 5. The first magnetic yoke layer 12 is patterned into the desired yoke shape in a conventional plating process. The pole tip assembly 15 is then formed by electroplating using the same resist frame thereby generating a self-aligned structure for the pole tip layers 16, 20, each of which has a thickness of a few gap lengths. The pole tip assembly is "stitched" to the first magnetic yoke layer 12, followed by the formation of the coil structure 28 and the layers of insulation. A "stiched" junction is one made by depositing a layer in intimate contact with an existing layer so that magnetic continuity is established between the two layers. The second magnetic yoke layer 22 is finally stitched to the second pole tip layer 20 to finish the thin film magnetic head structure.

Figure 3:
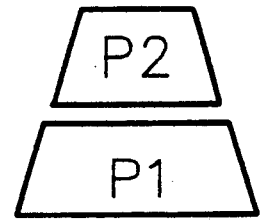
FIG. 3 is an air bearing surface view of the pole tips of a second embodiment of a prior art thin film magnetic head.
Figure 9A:
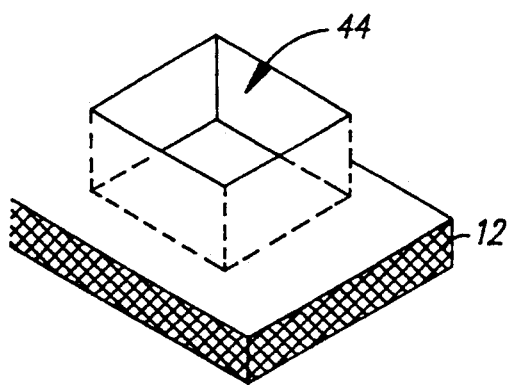
FIG. 9 is a series of perspective views A-F showing the process sequence for making the pole tips for the thin film magnetic head according to the present invention.
Figure 9B:
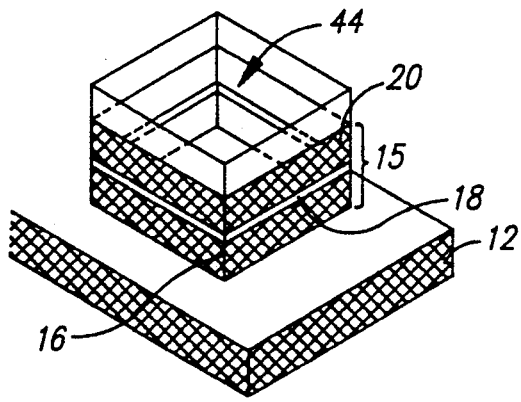
Figure 9C:
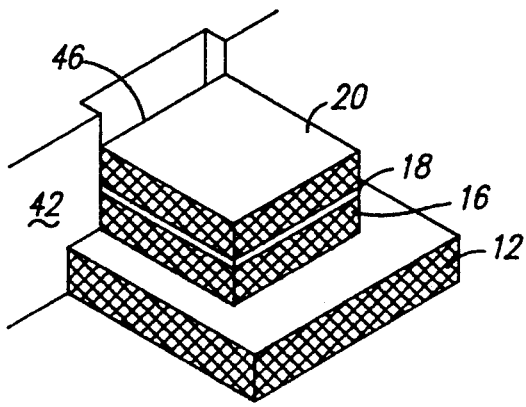
Figure 9D:
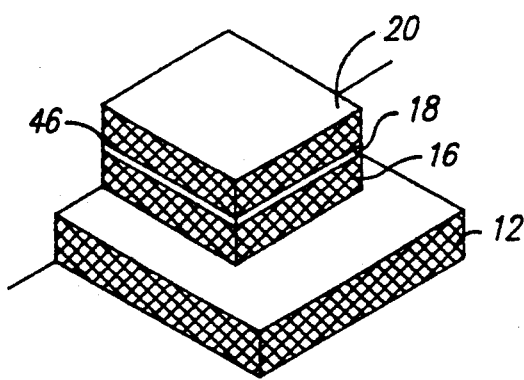
Figure 9E:
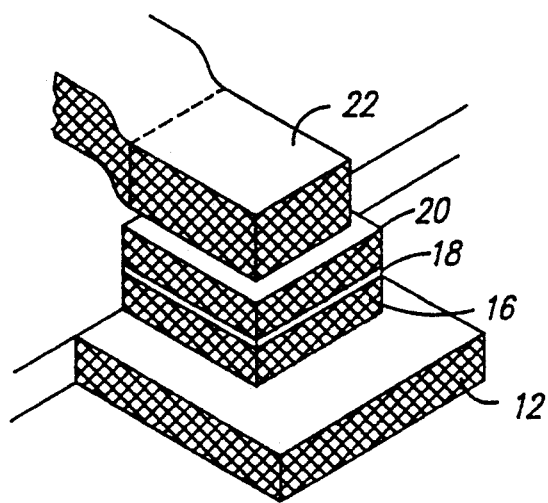
Figure 9F:
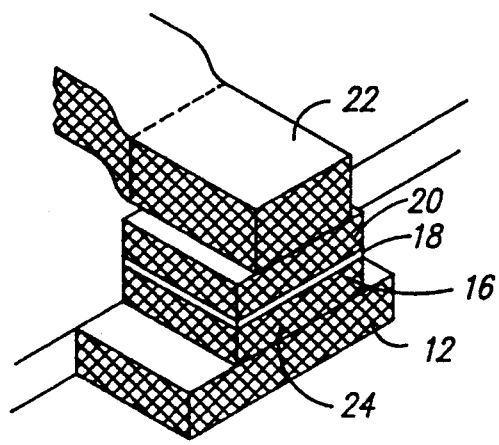

A specific embodiment of the process sequence, according to the present invention, will be described in conjunction with FIG. 9A-F. and this process sequence is suitable for producing the thin film magnetic head shown in FIG. 3. The first magnetic yoke layer 12 is deposited as a full film by plating and then patterned to the desired shape by a chemical etching process, for example. A NiFe plating base is deposited, and a layer 48 of patternable material such as photoresist, for example, is deposited and patterned to produce a rectangular opening 44 as shown in FIG. 9A. The pole tip assembly 15 is then formed in opening 44, as shown in FIG. 9B, by electroplating the first pole tip layer 16 with a suitable magnetic material such as NiFe, electroplating a metal nonmagnetic gap layer 18 with a suitable material such as NiP, Au, or Cu, and electroplating the second pole tip layer 20 with a suitable magnetic material such as NiFe. The front part of patternable layer 48 is then removed by being exposed and developed away to produce the layer 42 as shown in FIG. 9C. At the back edge 46 of the pole tip assembly 15, the layer 42 is self-aligned to the pole tips 16, 20. The layer 42 is then hard baked (FIG. 9D) to form the first layer of insulation 30, and in this case the insulation layer 30 is self-aligned to the back edge 46 of the pole tip assembly 15 which established the zero throat position. The coil structure 28 is then formed in conventional fashion, (see FIG. 7) and insulation layers 32 and 34 are formed. The second magnetic yoke layer 22 is then formed by plating, and this layer 22 is stiched to second pole tip layer 20 as shown in FIG. 9E. The thin film magnetic head structure is then lapped to form the ABS 24, and the resulting structure is shown in FIG. 9F.

Figure 10A:
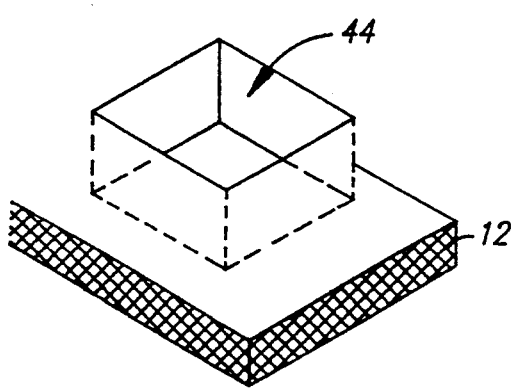
FIG. 10 is a series of perspective views A-D showing an alternate embodiment of the process sequence for making the pole tips for the thin film magnetic head according to the present invention.
Figure 10B:
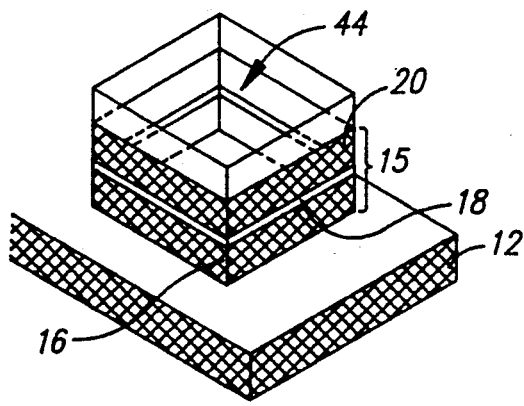
Figure 10C:
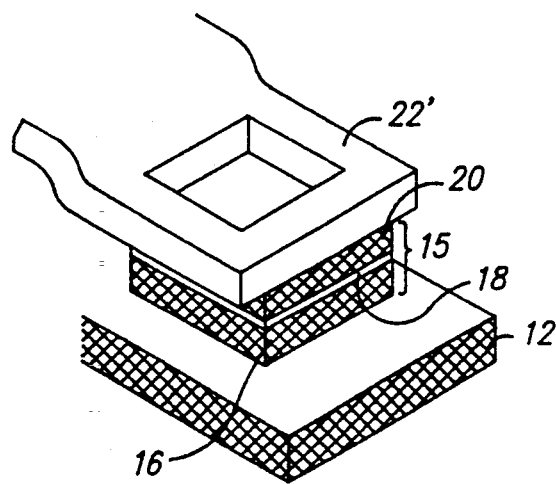
Figure 10D:
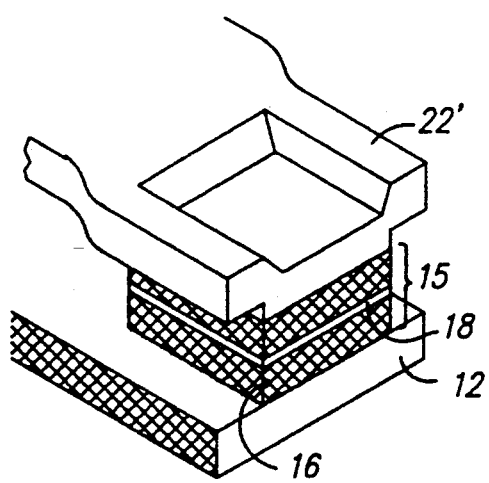

An alternate embodiment of the process sequence, according to the present invention, will be described in conjunction with FIG. 10A-10D, and this process sequence is suitable for producing the thin film magnetic shown in FIG. 8. The first magnetic yoke layer 12 is deposited as a full film by plating and then patterned to the desired shape by a chemical etching process, for example. A NiFe plating base is deposited, and a layer 48 of patternable insulator material such as Al$_2$O$_3$ or SiO$_2$, for example, is deposited and patterned to produce a rectangular opening 44 as shown in FIG. 10A. The pole tip assembly 15 is then formed in opening 44, as shown in FIG. 10B, by electroplating the first pole tip layer 16 with a suitable magnetic material such as NiFe, electroplating a metal nonmagnetic gap layer 18 with a suitable material such as NiP, Au, or Cu, and electroplating the second pole tip layer 20 with a suitable magnetic material such as NiFe. At the back edge 46 of the pole tip assembly 15, the layer 42 is self-aligned to the pole tips 16, 20. The layer 42 is retained in the head to form the first layer of insulation 30', and in this case the insulation layer 30' is self-aligned to the back edge 46 of the pole tip assembly 15 which established the zero throat position The coil structure 28 is then formed in conventional fashion, (see FIG. 7) and insulation layers 32 and 34 are formed. The second magnetic yoke layer 22' is then formed by plating, and this layer 22' is stiched to second pole tip layer 20 as shown in FIG. 10C. The thin film magnetic head structure is then lapped to form the ABS 24, and the resulting structure is shown in FIG. 10D.

While the invention has been particularly shown and described with reference to a preferred embodiment thereof, it will be understood by those skilled in the art that various other changes in the form and details may be made therein without departing from the spirit and scope of the invention.

Having thus described out invention, what we claim is new, and desire to secure by Letters Patent is:

1. A magnetic disk recording system comprising:
   a magnetic recording medium having a recording surface;
   a thin film magnetic head and an air bearing slider supporting said head;
   head arm means for supporting said air bearing slider with said magnetic head closely adjacent to the recording surface of said magnetic recording medium;
   accessing means for supporting said head arm means and for moving said head arm means relative to the recording surface of said magnetic recording medium;
   said thin film magnetic head comprising a first magnetic yoke layer extending from a back gap region to a sensing edge of said thin film magnetic head;
   a second magnetic yoke layer contacting said first magnetic yoke layer at said back gap region and extending to said sensing edge in a position aligned with but spaced from said first magnetic yoke layer; and
   a pole tip structure comprising a first pole tip layer, a gap forming layer and a second pole tip layer each having a substantially equal width, said pole tip structure disposed between said first and said second magnetic yoke layers at said sensing edge and extending from said sensing edge to a zero throat position, said zero throat position spaced from said sensing edge towards said backgap region, said first pole tip layer being in contact with said first magnetic yoke layer from said sensing edge to said zero throat position and said second pole tip layer being in contact with said second magnetic yoke layer from said sensing edge to said zero throat position, said first magnetic yoke layer having a width at said sensing edge greater than the width of said pole tip structure and said second magnetic yoke layer having a width at said sensing edge less than the width of said pole tip structure.

2. The thin film magnetic head of claim 1 wherein said gap forming layer defines a transducing gap having a gap length G, and wherein the thickness of said first and said second pole tip layers is greater than 2G.

3. The thin film magnetic head of claim 1 wherein said zero throat position is defined by an edge of said pole tip structure.

4. A thin film magnetic head having a magnetic circuit comprising:
   a first magnetic yoke layer extending from a back gap region to a sensing edge of said magnetic head;
   a second magnetic yoke layer contacting said first magnetic yoke layer at said back gap region and extending to said sensing edge in a position aligned with but spaced from said first magnetic yoke layer; and
   a pole tip structure comprising a first pole tip layer, a gap forming layer and a second pole tip layer each having a substantially equal width, said pole tip structure disposed between said first and said second magnetic yoke layers at said sensing edge and extending from said sensing edge to a zero throat position, said zero throat position spaced from said sensing edge towards said backgap region, said first pole tip layer being in contact with said first magnetic yoke layer from said sensing edge to said zero throat position and said second pole tip layer being in contact with said second magnetic yoke layer from said sensing edge to said zero throat position, said first magnetic yoke layer having a width at said sensing edge greater than the width of said pole tip structure and said second magnetic yoke layer having a width at said sensing edge less than the width of said pole tip structure.

5. The thin film magnetic head of claim 4 wherein said first magnetic yoke layer is wider at said sensing edge than said pole tip structure and said second magnetic yoke layer is narrower at said sensing edge than said pole tip structure.

6. The thin film magnetic head of claim 4 wherein said first and said second magnetic yoke layers are wider at said sensing edge than said pole tip structure.

* * * * *